(12) United States Patent  
Lakkis

(10) Patent No.: US 8,576,821 B2
(45) Date of Patent: *Nov. 5, 2013

(54) METHOD AND APPARATUS FOR IMPROVED DATA DEMODULATION IN A WIRELESS COMMUNICATION NETWORK

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 12/262,153

(22) Filed: Oct. 30, 2008

(65) Prior Publication Data

US 2009/0109945 A1    Apr. 30, 2009

Related U.S. Application Data

(60) Provisional application No. 60/984,296, filed on Oct. 31, 2007.

(51) Int. Cl.
*H04B 7/216* (2006.01)

(52) U.S. Cl.
USPC .......................................................... 370/342

(58) Field of Classification Search
USPC ............ 370/350; 375/331; 455/522; 345/179
See application file for complete search history.

(56) References Cited

U.S. PATENT DOCUMENTS

| | | | | |
|---|---|---|---|---|
| 4,847,869 A * | 7/1989 | Labedz et al. | | 375/331 |
| 6,441,810 B1 * | 8/2002 | Skoog et al. | | 345/179 |
| 6,922,406 B2 * | 7/2005 | Rudolf et al. | | 370/350 |
| 7,460,503 B2 | 12/2008 | Young | | |
| 7,706,376 B2 | 4/2010 | Waxman | | |
| 8,418,040 B2 | 4/2013 | Lakkis | | |
| 2003/0099223 A1 | 5/2003 | Chang et al. | | |
| 2003/0156574 A1 | 8/2003 | Raaf | | |
| 2005/0013391 A1 | 1/2005 | Boer et al. | | |
| 2005/0059420 A1 * | 3/2005 | Salokannel et al. | | 455/522 |
| 2005/0066121 A1 * | 3/2005 | Keeler | | 711/113 |
| 2005/0068934 A1 | 3/2005 | Sakoda | | |
| 2005/0099939 A1 * | 5/2005 | Huh et al. | | 370/210 |
| 2005/0163236 A1 | 7/2005 | Hammerschmidt et al. | | |
| 2005/0182975 A1 | 8/2005 | Guo et al. | | |
| 2006/0067280 A1 | 3/2006 | Howard et al. | | |
| 2007/0168841 A1 | 7/2007 | Lakkis | | |
| 2008/0049851 A1 * | 2/2008 | Nangia et al. | | 375/260 |
| 2009/0109952 A1 | 4/2009 | Lakkis | | |
| 2009/0109955 A1 | 4/2009 | Lakkis | | |
| 2010/0157907 A1 | 6/2010 | Taghavi Nasrabadi et al. | | |

FOREIGN PATENT DOCUMENTS

| | | |
|---|---|---|
| CN | 1698316 A | 11/2005 |
| CN | 1764089 A | 4/2006 |
| JP | 2000261462 A | 9/2000 |

(Continued)

OTHER PUBLICATIONS

Harada et al. "IEEE 802.15-07-0761-10-003c", Sep. 2007, IEEE 802.15 WPAN Task Group 3c, Entire Document.*

(Continued)

*Primary Examiner* — Joseph Bednash
(74) *Attorney, Agent, or Firm* — Dang M. Vo

(57) ABSTRACT

A wireless network uses an improved frame structure to increase timing acquisition capabilities as well as reduction of spectral lines. In one aspect, the frame packet can be used to communicate the different modes of operation under which the packet was created.

26 Claims, 16 Drawing Sheets

(56) References Cited

FOREIGN PATENT DOCUMENTS

| | | | |
|---|---|---|---|
| JP | 2001527247 A | 12/2001 | |
| JP | 2002164944 A | 6/2002 | |
| JP | 2004343509 A | 12/2004 | |
| JP | 2006325175 A | 11/2006 | |
| JP | 2007110326 A | 4/2007 | |
| JP | 2007537654 A | 12/2007 | |
| WO | 9933011 A1 | 7/1999 | |
| WO | 2005112354 | 11/2005 | |
| WO | 2006051456 A1 | 5/2006 | |
| WO | WO 2007138823 A1 | 12/2007 | |
| WO | 2009049241 | 4/2009 | |

OTHER PUBLICATIONS

Budisin, S.Z., "Efficient pulse compressor for Golay complementary sequences," Electronic Letters, 27, No. 3, pp. 219-220, Jan. 31, 1991.

Lakkis, I. et al., "A simple coherent GMSK demodulator," Personal, Indoor and Mobile Radio Communications, 2001 12th IEEE International Symposium on , vol. 1, No., pp. A-112-A-114 vol. 1, Sep. 2001.

Cheolhee Park et al: "Short-Range Wireless Communications for Next-Generation Networks: UWB. 60 GHz Millimeter-Wave WPAN, and ZigBee" IEEE Wireless Comminications. IEEE Service Center, Piscataway, NJ, US, vol. 14, No. 4. Aug. 1, 2007, pp. 70-78, XP011191781.

Ryuhei Funada et al: "A design of single carrier based PHY for IEEE 802,15.3c standard" IEEE International Symposium on Personal, Indoor and Mobile Radio Communications. PIMRC, IEEE: PI, XX, Sep. 1, 2007. pp. 1-5, XP031168950.

International Search Report—PCT/US08/082123, International Search Authority—European Patent Office—Feb. 6, 2009.

Written Opinion—PCT/US08/082123, International Search Authority—European Patent Office—Feb. 6, 2009.

Joongheon Kim et al: "Power Saving Medium Access for Beacon-Enabled IEEE 802.15.4 LR-WPANs" Human Interface and the Management of Information. Interacting in Information Environments; [Lecture Notes in Computer Science], Springer Berlin Heidelberg, Berlin, Heidelberg, vol. 4558, Jul. 22, 2007, pp. 555-562, XP019064405.

Taiwan Search Report—TW097142224—TIPO—May 29, 2012.

"UWB Demonstrates Growing Support for Common Signaling Mode," Microwave Journal, Jul. 2004, vol. 47, No. 7, p. 57.

\* cited by examiner

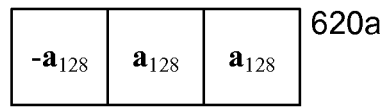 620a
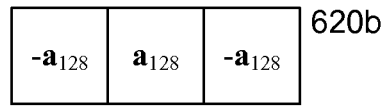 620b
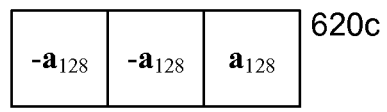 620c
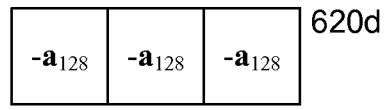 620d
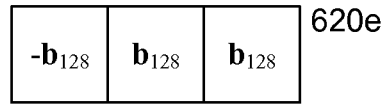 620e
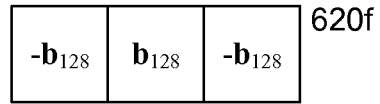 620f
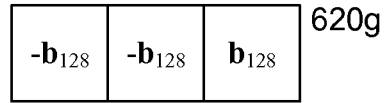 620g
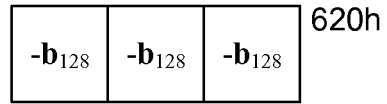 620h
FIG. 6

METHOD AND APPARATUS FOR IMPROVED DATA DEMODULATION IN A WIRELESS COMMUNICATION NETWORK

CLAIM OF PRIORITY UNDER 35 U.S.C. §119

The present Application for Patent claims priority to Provisional Application No. 60/984,296, entitled "Frame Format for UWB System Employing Common Mode Signaling and Beamforming" filed Oct. 31, 2007, and assigned to the assignee hereof and hereby expressly incorporated by reference herein.

BACKGROUND

I. Field of the Disclosure

This disclosure relates generally to wireless communication systems and, more particularly, to wireless data transmission in a wireless communication system.

II. Description of the Related Art

In one aspect of the related art, devices with a physical (PHY) layer supporting either single carrier or Orthogonal Frequency Division Multiplexing (OFDM) modulation modes may be used for millimeter wave communications, such as in a network adhering to the details as specified by the Institute of Electrical and Electronic Engineers (IEEE) in its 802.15.3c standard. In this example, the PHY layer may be configured for millimeter wave communications in the spectrum of 57 gigahertz (GHz) to 66 GHz and specifically, depending on the region, the PHY layer may be configured for communication in the range of 57 GHz to 64 GHz in the United States and 59 GHz to 66 GHz in Japan.

To allow interoperability between devices or networks that support either OFDM or single-carrier modes, both modes further support a common mode. Specifically, the common mode is a single-carrier base-rate mode employed by both OFDM and single-carrier transceivers to facilitate co-existence and interoperability between different devices and different networks. The common mode may be employed to provide beacons, transmit control and command information, and used as a base rate for data packets.

A single-carrier transceiver in an 802.15.3c network typically employs at least one code generator to provide spreading of the form first introduced by Marcel J. E. Golay (referred to as Golay codes), to some or all fields of a transmitted data frame and to perform matched-filtering of a received Golay-coded signal. Complementary Golay codes are sets of finite sequences of equal length such that a number of pairs of identical elements with any given separation in one sequence is equal to the number of pairs of unlike elements having the same separation in the other sequences. S. Z. Budisin, "Efficient Pulse Compressor for Golay Complementary Sequences," Electronic Letters, 27, no. 3, pp. 219-220, Jan. 31, 1991, which is hereby incorporated by reference, shows a transmitter for generating Golay complementary codes as well as a Golay matched filter.

For low-power devices, it is advantageous for the common mode to employ a Continuous Phase Modulated (CPM) signal having a constant envelope so that power amplifiers can be operated at maximum output power without affecting the spectrum of the filtered signal. Gaussian Minimum Shift Keying (GMSK) is a form of continuous phase modulation having compact spectral occupancy by choosing a suitable bandwidth time product (BT) parameter in a Gaussian filter. The constant envelope makes GMSK compatible with nonlinear power amplifier operation without the concomitant spectral regrowth associated with non-constant envelope signals.

Various techniques may be implemented to produce GMSK pulse shapes. For example, $\pi/2$-binary phase shift key (BPSK) modulation (or $\pi/2$-differential BPSK) with a linearized GMSK pulse may be implemented, such as shown in I. Lakkis, J. Su, & S. Kato, "A Simple Coherent GMSK Demodulator", IEEE Personal, Indoor and Mobile Radio Communications (PIMRC) 2001, which is incorporated by reference herein, for the common mode.

SUMMARY

Aspects disclosed herein may be advantageous to systems employing millimeter-wave wireless personal area networks (WPANs) such as defined by the IEEE802.15.3c protocol. However, the disclosure is not intended to be limited to such systems, as other applications may benefit from similar advantages.

According to an aspect of the disclosure, a method of communication is provided. More specifically, a packet is generated and such packet has a header that comprises location information of the packet with respect to a beacon. Thereafter, the packet is transmitted, wherein the packet and the beacon are transmitted within a superframe.

According to another aspect of the disclosure, a communication apparatus comprises means for generating a packet having a header that comprises location information of the packet with respect to a beacon and means for transmitting the packet, wherein the packet and the beacon are transmitted within a superframe.

According to another aspect of the disclosure, an apparatus for communications comprises a processing system configured to generate a packet having a header that comprises location information of the packet with respect to a beacon and transmit the packet, wherein the packet and the beacon are transmitted within a superframe.

According to another aspect of the disclosure, a computer-program product for wireless communications comprises a machine-readable medium encoded with instructions executable to generate a packet having a header that comprises location information of the packet with respect to a beacon and transmit the packet, wherein the packet and the beacon are transmitted within a superframe.

According to another aspect of the disclosure, a method of communication is provided. More specifically, a packet is received and such packet has a header that comprises location information of the packet with respect to a beacon, wherein the packet and the beacon are transmitted within a superframe. Thereafter, the location information is used to determine a location within the superframe.

According to another aspect of the disclosure, a communication apparatus comprises means for receiving a packet having a header that comprises location information of the packet with respect to a beacon, wherein the packet and the beacon are transmitted within a superframe and means for using the location information to determine a location within the superframe.

According to another aspect of the disclosure, an apparatus for communications comprises a processing system configured to receive a packet having a header that comprises location information of the packet with respect to a beacon, wherein the packet and the beacon are transmitted within a superframe and use the location information to determine a location within the superframe.

According to another aspect of the disclosure, a computer-program product for wireless communications comprises a machine-readable medium encoded with instructions executable to receive a packet having a header that comprises a location information of the packet with respect to a beacon, wherein the packet and the beacon are transmitted within a superframe and use the location information to determine a location within the superframe.

According to another aspect of the disclosure, a method for wireless communication is provided. More specifically, a packet is generated and such packet comprises a first portion and a second portion separated by a delimiter, wherein the delimiter is further used to signal a characteristic of the second portion. Thereafter, the packet is transmitted.

According to another aspect of the disclosure, a communication apparatus comprises means for generating a packet that comprises a first portion and a second portion separated by a delimiter, wherein the delimiter is further used to signal a characteristic of the second portion and means for transmitting the packet.

According to another aspect of the disclosure, a communication apparatus comprises a processing system configured to generate a packet that comprises a first portion and a second portion separated by a delimiter, wherein the delimiter is further used to signal a characteristic of the second portion and transmit the packet.

According to another aspect of the disclosure, a computer-program product for communications comprises a machine-readable medium encoded with instructions executable to generate a packet that comprises a first portion and a second portion separated by a delimiter, wherein the delimiter is further used to signal a characteristic of the second portion and transmit the packet.

According to another aspect of the disclosure, a method of communication is provided. More specifically, a payload of a packet is divided into a plurality of data blocks, wherein each data block comprises Golay codes and data portions, and every data portion is between two Golay codes and information is inserted between data blocks of the plurality of data blocks, said information enabling at least one of time, channel and frequency estimation. Thereafter, the packet is transmitted.

According to another aspect of the disclosure, an apparatus for communication, comprises means for dividing a payload of a packet into a plurality of data blocks, wherein each data block comprises Golay codes and data portions, and every data portion is between two Golay codes, means for inserting information between data blocks of the plurality of data blocks, said information enabling at least one of time, channel and frequency estimation and means for transmitting the packet.

According to another aspect of the disclosure, an apparatus for wireless communications comprises a processing system configured to divide a payload of a packet into a plurality of data blocks, wherein each data block comprises Golay codes and data portions, and every data portion is between two Golay codes, insert information between data blocks of the plurality of data blocks, said information enabling at least one of time, channel and frequency estimation and transmit the packet.

According to another aspect of the disclosure, a computer-program product for communication comprises a machine-readable medium encoded with instructions executable to divide a payload of a packet into a plurality of data blocks, wherein each data block comprises Golay codes and data portions, and every data portion is between two Golay codes, insert information between data blocks of the plurality of data blocks, said information enabling at least one of time, channel and frequency estimation and transmit the packet.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

Aspects according to the disclosure are understood with reference to the following figures.

FIG. 6 is a diagram of multiple start frame delimiters that may be used in accordance with an aspect of the disclosure;

Figure 1:
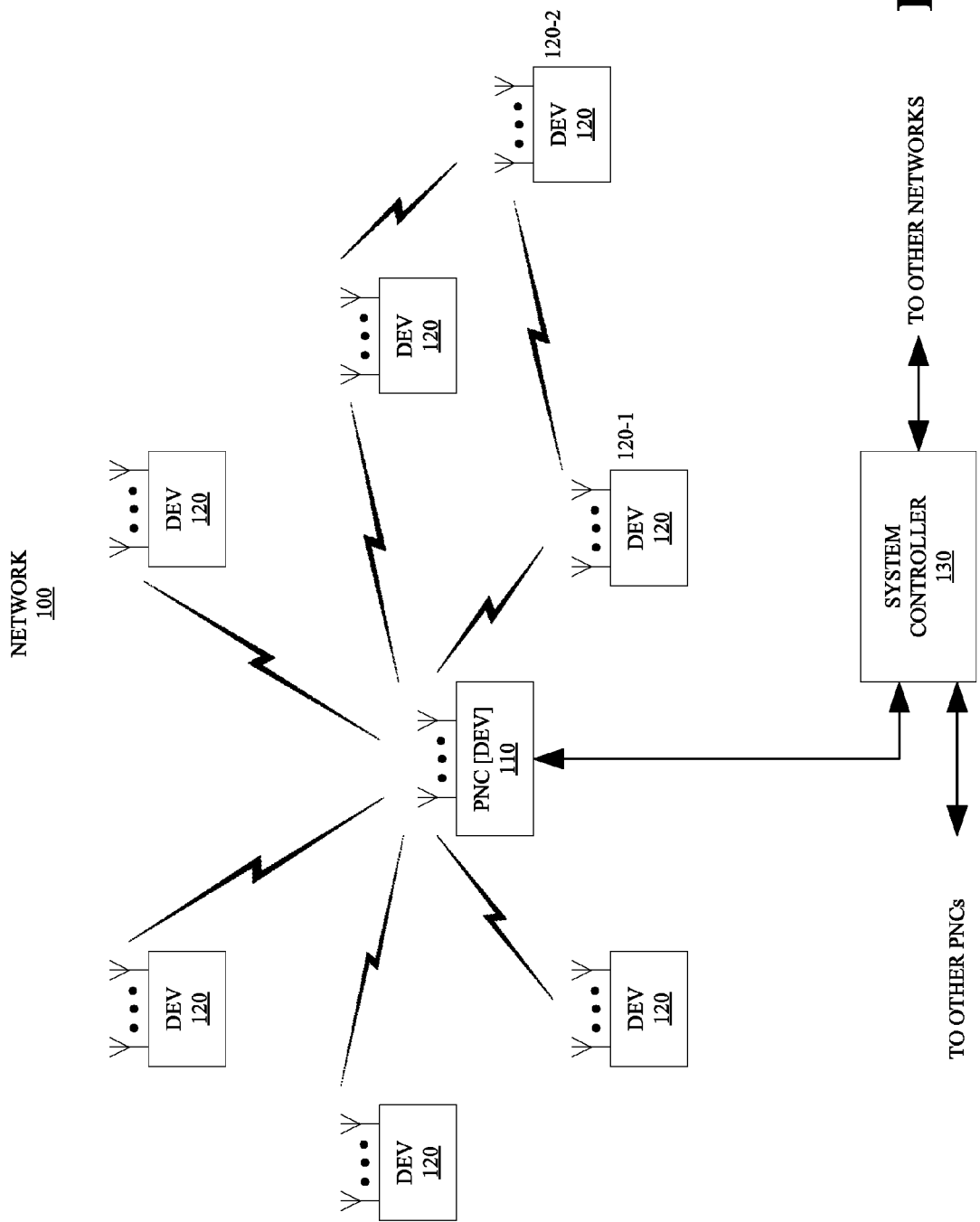
FIG. 1 is a diagram of a wireless network configured in accordance with an aspect of the disclosure.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the disclosure. It should be understood, however, that the particular aspects shown and described herein are not intended to limit the disclosure to any particular form, but rather, the disclosure is to cover all modifications, equivalents, and alternatives falling within the scope of the disclosure as defined by the claims.

Several aspects of a wireless network 100 will now be presented with reference to FIG. 1, which is a network formed in a manner that is compatible with the IEEE 802.15.3c Personal Area Networks (PAN) standard and herein referred to as a piconet. The network 100 is a wireless ad hoc data communication system that allows a number of independent data devices such as a plurality of data devices (DEVs) 120 to communicate with each other. Networks with functionality similar to the network 100 are also referred to as a basic service set (BSS), or independent basic service (IBSS) if the communication is between a pair of devices.

Each DEV of the plurality of DEVs 120 is a device that implements a MAC and PHY interface to the wireless medium of the network 100. A device with functionality similar to the devices in the plurality of DEVs 120 may be referred to as an access terminal, a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

Under IEEE 802.15.3c, one DEV will assume the role of a coordinator of the piconet. This coordinating DEV is referred to as a PicoNet Coordinator (PNC) and is illustrated in FIG. 1 as a PNC 110. Thus, the PNC includes the same device functionality of the plurality of other devices, but provides coordination for the network. For example, the PNC 110 provides services such as basic timing for the network 100 using a beacon; and management of any Quality of Service (QoS) requirements, power-save modes, and network access control. A device with similar functionality as described for the PNC 110 in other systems may be referred to as an access point, a base station, a base transceiver station, a station, a terminal, a node, an access terminal acting as an access point, or some other suitable terminology. The PNC 110 coordinates the communication between the various devices in the network 100 using a structure referred as a superframe. Each superframe is bounded based on time by beacon periods.

The PNC 110 may also be coupled to a system controller 130 to communicate with other networks or other PNCs.

Figure 2:
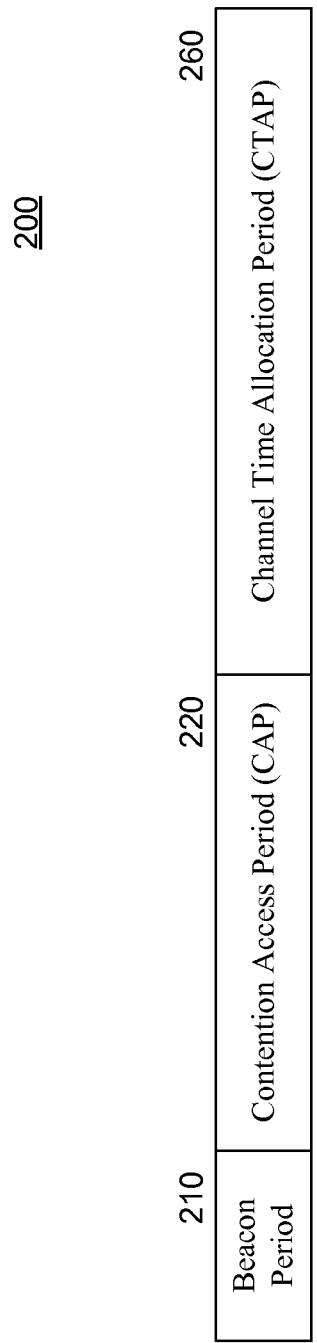
FIG. 2 is a diagram of a superframe timing configured in accordance with an aspect of the disclosure that is used in the wireless network of FIG. 1.

FIG. 2 illustrates a superframe 200 used for piconet timing in the network 100. In general, a superframe is a basic time division structure containing a beacon period, a channel time allocation period and, optionally, a contention access period. The length of a superframe is also known as the beacon interval (BI). In the superframe 200, a beacon period (BP) 210 is provided during which a PNC such as the PNC 110 sends beacon frames, as further described herein.

A Contention Access Period (CAP) 220, is used to communicate commands and data either between the PNC 110 and a DEV in the plurality of DEVs 120 in the network 100, or between any of the DEVs in the plurality of DEVs 120 in the network 100. The access method for the CAP 220 can be based on a slotted aloha or a carrier sense multiple access with collision avoidance (CSMA/CA) protocol. The CAP 220 may not be included by the PNC 110 in each superframe.

A Channel Time Allocation Period (CTAP) 260, which is based on a Time Division Multiple Access (TDMA) protocol, is provided by the PNC 110 to allocate time for the plurality of DEVs 120 to use the channels in the network 100. Specifically, the CTAP is divided into one or more time periods, referred to as Channel Time Allocations (CTAs), that are allocated by the PNC 110 to pairs of devices; one pair of devices per CTA. Thus, the access mechanism for CTAs is TDMA-based.

Figure 3:
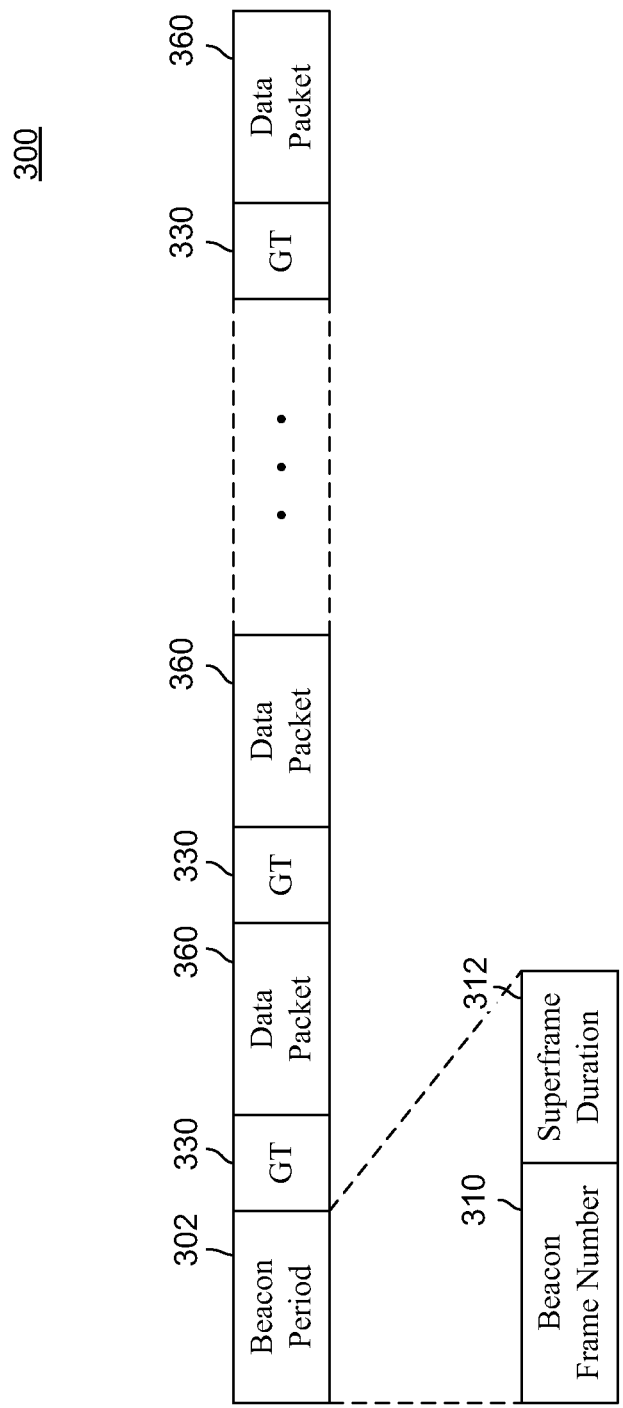
FIG. 3 is a diagram of a superframe structure configured in accordance with an aspect of the disclosure that is used in the wireless network of FIG. 1.

FIG. 3 illustrates, as viewed from a data perspective, a superframe structure 300 as employed by the network 100. The superframe structure 300 begins with a beacon period 302 in which a piconet controller such as the PNC 110 broadcasts various control parameters, including a beacon frame number 310 and a superframe duration 312. This information is sent via one or more beacon packets (not shown). The transmission of a series of data packets 360 follows the beacon period 302. These data packets may be transmitted by the PNC 110 or different devices that are members of the piconet. Each beacon period, such as the beacon period 302, or any data packet, such as the data packet 360, is typically followed by a guard time (GT) 330.

Figure 4:
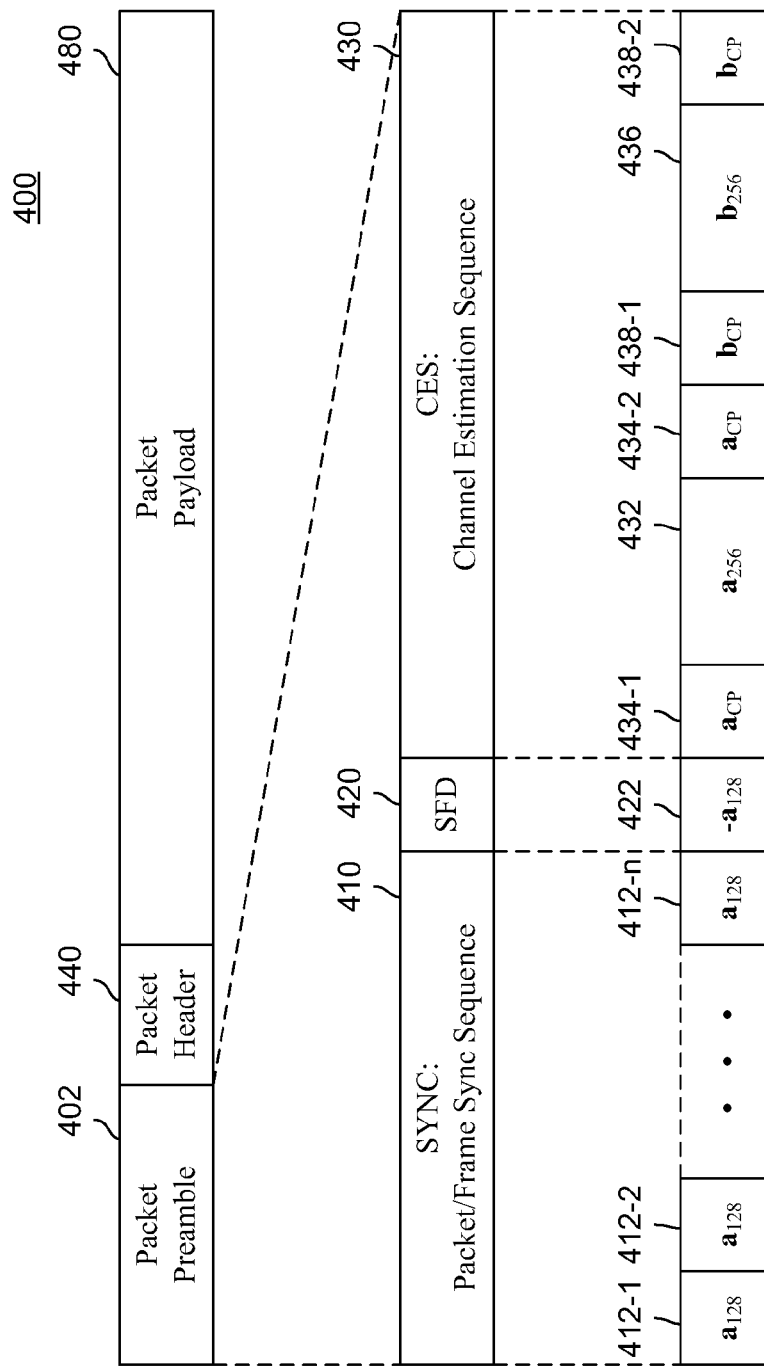
FIG. 4 is a diagram of a frame/packet structure configured in accordance with an aspect of the disclosure that is used in the superframe structure of FIG. 3.

FIG. 4 is an example of a frame structure 400 that may be used for a single carrier, OFDM or common mode frame. As used herein, the term "frame" may also be referred to as a "packet", and these two terms should be considered synonymous.

The frame structure 400 includes a preamble 402, a header 440, and a packet payload 480. The common mode uses Golay codes for all three fields, i.e. for the preamble 402, the header 440 and the packet payload 480. The common-mode signal uses Golay spreading codes with chip-level $\pi/2$-BPSK modulation to spread the data therein. The header 440, which is a physical layer convergence protocol (PLCP) conforming header, and the packet payload 480, which is a physical layer service data unit (PSDU), includes symbols spread with a Golay code pair of length-64. Various frame parameters, including, by way of example, but without limitation, the number of Golay-code repetitions and the Golay-code lengths, may be adapted in accordance with various aspects of the frame structure 400. In one aspect, Golay codes employed in the preamble may be selected from length-128 or length-256 Golay codes. Golay codes used for data spreading may comprise length-64 or length-128 Golay codes.

Referring back to FIG. 4, the preamble 402 includes a packet sync sequence field 410, a start frame delimiter (SFD) field 420, and a channel-estimation sequence field 430. The preamble 402 may be shortened when higher data rates are used. For example, the default preamble length may be set to 36 Golay codes for the common mode, which is associated with a data rate on the order of 50 Mbps. For a data rate in the order of 1.5 Gbps data rate, the preamble 402 may be shortened to 16 Golay codes, and for data rates around 3 Gbps, the preamble 402 may be further shortened to 8 Golay codes. The preamble 402 may also be switched to a shorter preamble based upon either an implicit or explicit request from a device.

The packet sync sequence field 410 is a repetition of ones spread by one of the length-128 complementary Golay codes ($a^i_{128}$, $b^i_{128}$) as represented by codes 412-1 to 412-n in FIG. 4. The SFD field 420 comprises a specific code such as {−1} that is spread by one of the length-128 complementary Golay codes ($a^i_{128}$, $b^i_{128}$), as represented by a code 422 in FIG. 4. The CES field 430 may be spread using a pair of length-256 complementary Golay codes ($a^i_{256}$, $b^i_{256}$), as represented by codes 432 and 436, and may further comprise at least one cyclic prefix, as represented by 434-1 and 438-1, such as $a^i_{CP}$ or $b^i_{CP}$, which are length-128 Golay codes, where CP is the Cyclic Prefix or Postfix. A cyclic postfix for each of the codes 432 and 436, such as $a^i_{CP}$ or $b^i_{CP}$, respectively, as represented by 434-2 and 438-2, respectively, are length-128 Golay codes.

In one aspect, the header 440 employs approximately a rate one-half Reed Solomon (RS) coding, whereas the packet payload 480 employs a rate-0.937 RS coding, RS(255,239). The header 440 and the packet payload 480 may be binary or complex-valued, and spread using length-64 complementary Golay codes $a^i_{64}$ and/or $b^i_{64}$. Preferably, the header 440 should be transmitted in a more robust manner than the packet payload 480 to minimize packet error rate due to header error rate. For example, the header 440 can be provided with 4 dB to 6 dB higher coding gain than the data portion in the packet payload 480. The header rate may also be adapted in response to changes in the data rate. For example, for a range of data rates up to 1.5 Gbps, the header rate may be 400 Mbps. For data rates of 3 Gbps, the header rate may be 800 Mbps, and for a range of data rates up to 6 Gbps, the header rate may be set at 1.5 Gbps. A constant proportion of header rate may be maintained to a range of data rates. Thus, as the data rate is varied from one range to another, the header rate may be adjusted to maintain a constant ratio of header rate to data-rate range. It is important to communicate the change in header rate to each device in the plurality of DEVs 120 in the network 100. However, the current frame structure 400 in FIG. 4 used by all modes (i.e., single carrier, OFDM and common modes), do not include an ability to do this.

Figure 5:
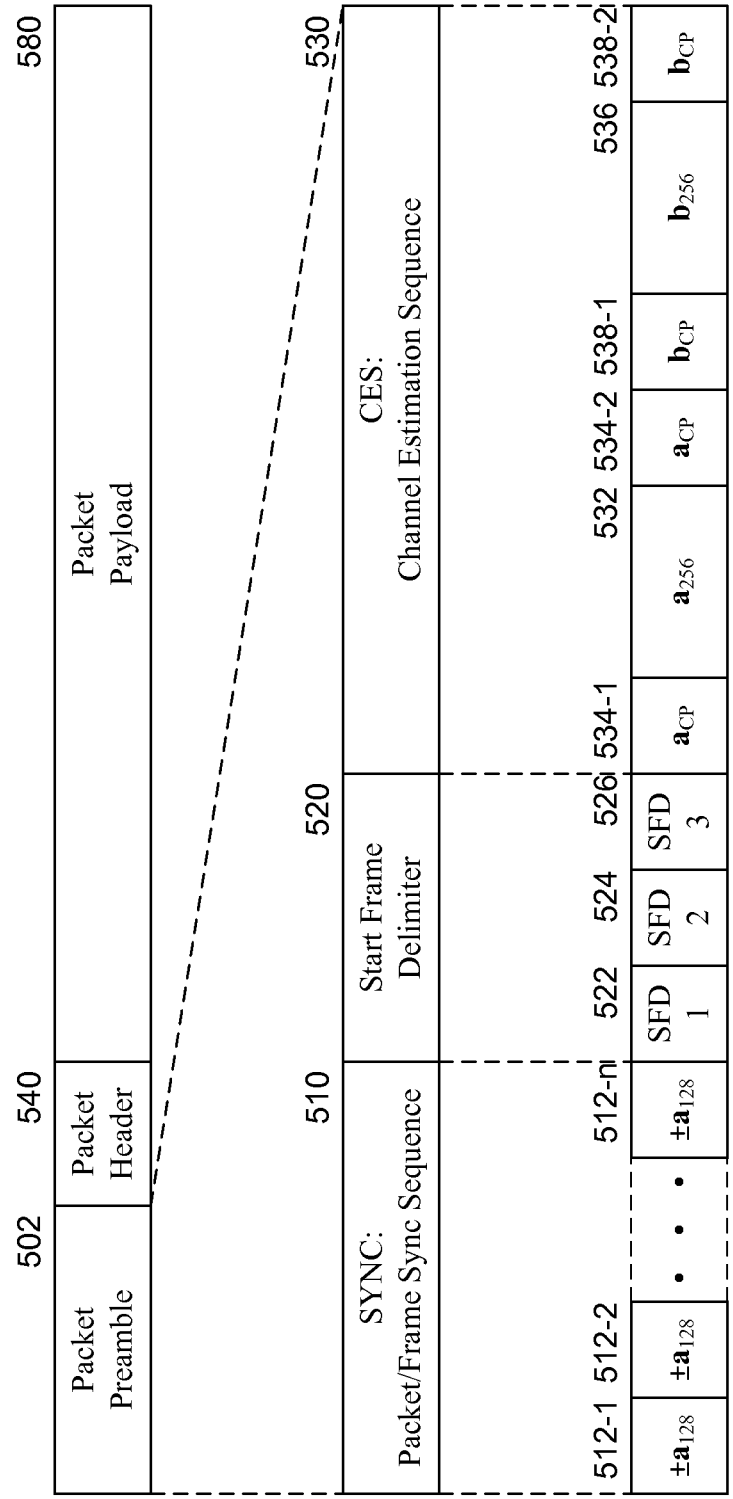
FIG. 5 is a diagram of an improved frame/packet structure that supports signaling for multiple header rates in accordance with an aspect of the disclosure.

FIG. 5 illustrates an improved frame structure 500 that supports signaling for multiple header rates and multi PHY modes in accordance with an aspect of the disclosure. In this aspect, there may be up to four different header rates, each of which corresponds to a particular data rate or a range of data rates. Alternative aspects may provide for different numbers of header and data rates. The frame structure 500 includes a preamble 502, a header 540, and a packet payload 580. The header 540, and packet payload 580 portions are configured in a similar fashion to the header 440 and the packet payload 480. The preamble 502 includes a packet sync sequence field 510, a start frame delimiter (SFD) code block 520, and a channel-estimation sequence field 530.

In the aspect illustrated in FIG. 5, the SFD code block 520 comprises three codes SFD 1 522, SFD 2 524, and SFD 3 526. Further referring to FIG. 6, in one aspect, a default header rate may be set to corresponds to an SFD code block 620a, denoted by [−1 +1 +1], where the sign corresponds to the sign of the Golay code transmitted. For a first header rate (e.g., 400 Mbps), the SFD code block 520 is an SFD code block 620b, denoted by [−1 +1 −1]. For a header rate of 800 Mbps, the SFD code block 520 is an SFD code block 620c, denoted by [−1 −1 +1], and for a 1.5Gbps header rate, the SFD code block 520 is an SFD code block 620d, denoted by [−1 −1 −1]. In another aspect, a set of different SFD code blocks may be constructed using a complementary Golay codes, as indicated by a plurality of SFD code blocks 620e to 620h in FIG. 6. In addition to just providing the header rate, the SFD patterns may also be used to provide other information, including differentiating between a single carrier and OFDM packets or differentiating between a beacon packet and a data packet. Furthermore, the SFD may be used to indicate a special type of packet used for beamforming. For example, the SFD pattern 620a in FIG. 6 is assigned to beacon packets, the SFD patterns 620b, 620c, and 620d are assigned to single carrier data packets to differentiate between header rates of 400 Mbps, 800 Mbps, and 1.5 Gbps respectively, and the SFD patterns 620e, 620f, 620g are assigned to OFDM data packets to differentiate between rates of 900 Mbps, 1.5 Gbps, and 3 Gbps respectively, and the SFD pattern 620h is assigned to beamforming training packets. Any device in the plurality of DEVs 120 that is performing preamble detection will search for these SFD patterns.

In an aspect of the disclosure, the codes a in the packet sync sequence field 510 may be scrambled by a cover code, such that each code a is multiplied by {+1} or {−1}. This may be done to reduce spectral lines that would otherwise result from code repetition in the packet sync sequence field 510. Furthermore, the SFD code block 520 can be encoded with the complementary code b, as illustrated and discussed previously in FIG. 5 and FIG. 6. Thus, various combinations of a and b may be employed in the SFD code block 520.

As previously discussed, during the beacon period 302, which is located at the beginning (i.e., time zero) of each superframe, one or more beacon packets will be sent by the PNC 110 to set the superframe duration, the CAP end time, the time allocations and to communicate management information for the piconet. When more than one beacon packet is transmitted by the PNC, beacon packet number one is transmitted at time zero and the remaining beacon packets contain information about the time offset from the beginning of the superframe. As beacon packets are critical for the proper functioning of all devices in the network 100, any beacon packet to be sent during the beacon period 302 is transmitted using a common-mode signal so that it can be understood by all devices. Further, no device can transmit until it has synchronized itself with the network. Thus, all devices in the plurality of DEVs 120 must attempt to determine whether an existing network exists by detecting the beacon and locating the beginning of a superframe.

Each device in the wireless network 100, upon start-up, searches for the superframe start time by locking to the beacon period 302. Because the same Golay code is used for spreading the preambles for both beacon packets and data packets, whether each received segment is a beacon packet or a data packet is determined by decoding the header 440. However, this can be a problem for low-power devices, especially when long superframes (e.g., 65 ms long) are employed, since the device has to try to decode every packet for up to 20 ms before finding the beacon period.

Furthermore, some data packets may employ the same spreading and protection for the header 440 as the beacon 302, and thus will pass the CRC.

Figure 7:
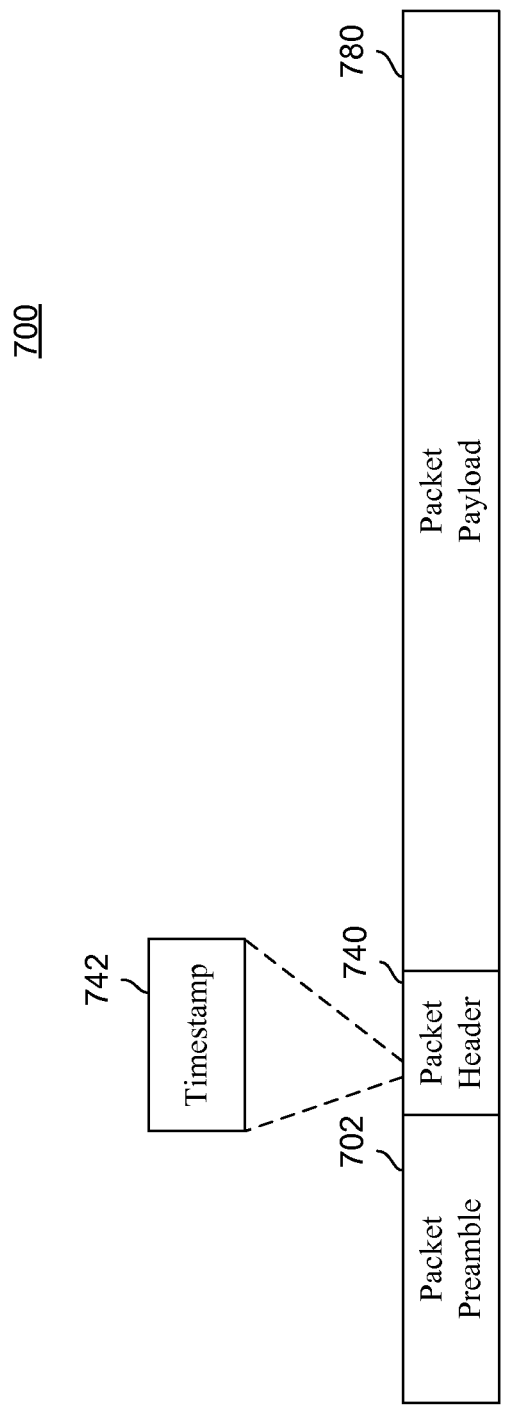
FIG. 7 is a diagram of an improved frame/packet structure that supports signaling for superframe timing detection in accordance with an aspect of the disclosure.

FIG. 7 illustrates an improved frame structure 700 that supports time stamping and superframe timing information communication. In one aspect, the frame structure 700 includes a preamble 702, a header 740, and a packet payload 780. The preamble 702 and packet payload 780 portions are configured in a similar fashion to the preamble 402 and the packet payload 480 of the frame structure 400 of FIG. 4. The frame structure 700 further includes a time stamp 742 in the header 740 that provides improved communication of the timing information of the superframe being transmitted. The time stamp 742 may be configured to include information to allow any device, once the device has received and decoded the time stamp 742, to determine one or more of the following pieces of information in the following list, which is presented as examples and is not to be limiting: location information of the transmitted frame within the superframe, the superframe length, the start of the superframe, the end of the superframe, the location of the beacon and a location of the CAP. Collectively, the list of information is referred to herein as the superframe timing information. Thus, when a device in the plurality of DEVs 120 desires to locate superframe timing information, it can capture any frame and, upon decoding the time stamp in the frame, will be able to determine superframe timing information. The time stamp 742 can thus assist the device to locate the beacon period. Preferably, the time stamp 742 will be positioned as the first field in the header field 740 so the device can avoid having to decode the entire header and, instead, only decode the portion of the header 740 it needs to determine the superframe timing information it needs.

Some packets are transmitted without a header (for example, some beamforming packets may be transmitted without headers and payloads), and in this case then the SFD code block 520 may be configured to identify these packets so that the receiving device would know that these packets contain no timing information.

In one aspect of the disclosure, in cases where the same preamble may be used by devices supporting both single carrier and OFDM modes. Thus, the SFD code block 520 can use different sets of SFD patterns that are assigned to single carrier and OFDM modes in order for a receiving device to differentiate between single carrier and OFDM packets.

In an aspect of the disclosure, the time stamp 742 can be compressed to reduce overhead if needed. For example, an eight-bit time stamp may be used from which the location of the beacon can be computed, but with less resolution.

Once the device locates the beacon, it may go into a sleep mode to save power and awaken just before the beacon period to detect, for example, the header rate. Thus, when a device in the plurality of DEVs 120 needs to determine the header rate, it can acquire that information by timing the power-up or awakening at a sufficient time before the beacon period.

Figure 8:
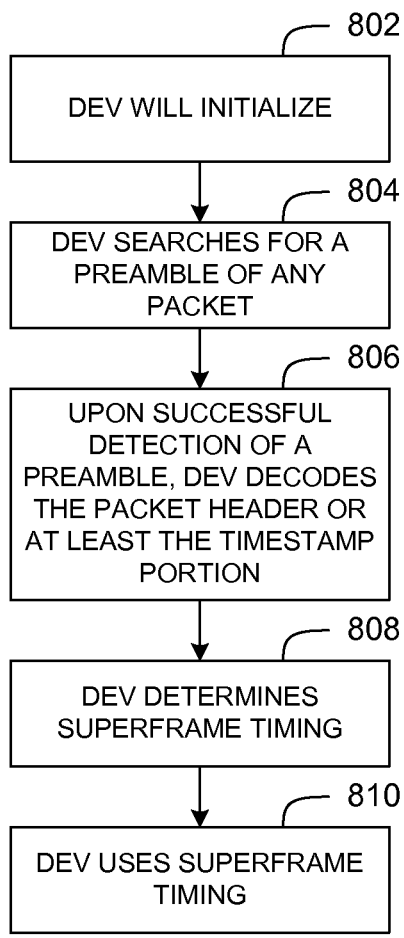
FIG. 8 is a flow chart illustrating a process for determining superframe timing information in accordance with an aspect of the disclosure.

FIG. 8 illustrates a superframe timing information acquisition process 800 that may be performed by a device in the plurality of DEVs 120 to acquire superframe timing information in one aspect of the disclosure. In step 802, DEV will initialize and prepare to perform wireless communication with the network 100. In step 804, the DEV will try to detect the preamble of a beacon frame or data frame. Assuming the detection is successful, the DEV will decode the header, or at least timestamp portion of the header in step 806. Then, in step 808, the DEV can determine superframe timing information from the decoded timestamp.

Once the superframe timing information has been determined by the DEV, it will have the option of using it in step 810. In one aspect of the disclosure, as discussed previously herein, the DEV may decide to enter into a low-power or sleep mode until the next beacon period to acquire the full information about the superframe being transmitted by the PNC 110. For example, the DEV may put itself to sleep for a predetermined period, such as a period of time sufficient for the current superframe to end. As another example, the DEV can enter into the sleep mode for more than one beacon period, and periodically awaken to acquire superframe timing information. Although there may be certain requirements for a device such as the DEV to operate within guidelines so as not to miss more than a predetermined number of beacons for concerns of losing synchronization, the DEV in this scenario can still maintain timing synchronization because of its use of the timestamp.

In another aspect, if DEV detects the timestamp and finds that the superframe is in the CAP phase, then the DEV can attempt to join the network 100 without having to wait for the beacon and CAP phase.

In another aspect, the DEV may detect whether a particular channel in the network 100 is busy without having to wait to detect a beacon. In this aspect, once the DEV detects a timestamp, it will assume that channel is busy and the move to next channel.

As already discussed above, the timestamp facilitates beacon and superframe timing detection because DEV does not have to decode every packet to determine if a particular packet is a beacon packet. At the most, the DEV just has to decode one timestamp successfully. Thus, the DEV does not have to decode completely the header and possibly data to determine if the packet is a beacon packet or not.

The timestamp can also be used to improve acquisition of signal and joining of the network by the plurality of DEVs 120. For example, assume a DEV 120-2 is far enough away from the PNC 110 not to have good detection of the beacon transmitted by the PNC 110. However, also assume the DEV 120-1 is closer to the PNC 110 but also close to the DEV 120-2 and can reliably detect the beacon from the PNC 110. Because all devices will include timestamp information in their transmissions and the DEV 120-2 can hear the transmissions from DEV 120-1, the DEV 120-2 will have a better idea of the beacon location and can alter its operation to improve its chances of receiving the beacon. For example, the DEV 120-2 can lower its preamble detection threshold during the expected time of beacon transmission from the PNC 110, which is a function of Signal-to-Noise Ratio (SNR) or Signal-to-Noise/Interference Ratio (SNIR), because it is more certain that a detection will not be a false positive.

In some aspects of the disclosure, preambles for different piconets operating in the same frequency band may employ cover sequences that provide for orthogonality in time and/or frequency. In one aspect, a first piconet controller PNC1 uses a first Golay code $a1281$ of length 128, a second piconet controller PNC2 uses $a1282$, and a third piconet controller PNC3 uses $a1283$. The preamble is formed from 8 repetitions of each Golay code multiplied by an orthogonal covering code, such as shown in the following case:

PNC1 transmits: $+a^1 \ +a^1 \ +a_1 \ +a^1 \ +a^1 \ +a^1 \ +a^1 \ +a^1$ (cover code [1 1 1 1 1])

PNC2 transmits: $+a^2 \ -a^2 \ +a^2 \ -a^2 \ +a^2 \ -a^2 \ +a^2 \ -a^2$ (cover code [1 −1 1 −1])

PNC3 transmits: $+a^3 \ +a^3 \ -a^3 \ -a^3 \ +a^3 \ +a^3 \ -a^3 \ -a^3$ (cover code ([1 1 −1 −1])

Thus, even though the system is asynchronous, there is still orthogonality at any time shift.

In this case, these are the only three binary codes that are periodically orthogonal. For example, periodic orthogonality means that if a first covering code is repeated, such as:

1 −1 1 −1 1 −1 1 −1 . . . , and it is matched-filtered to a second, orthogonal covering code, the result is zero everywhere except at the leading and trailing edges of the repeated code.

In some aspects of the disclosure, non-binary cover codes may be provided. For example, complex covering codes of length 4 are shown as follows:

cover1=ifft([1 0 0 0])=[1 1 1 1]
cover2=ifft([0 1 0 0])=[1 j 31 1 −j]
cover3=ifft([0 0 1 0])=[1 −1 1 −1]
cover4=ifft([0 0 0 1])=[1 −j −1 j]

These codes may be used to multiply a particular Golay code (e.g., a(1)) as follows [$a^1$.cover1(1) $a^1$.cover1(2) $a^1$.cover1(3) $a^1$.cover1(4)]. The Fast Fourier Transform (FFT) of this sequence is nonzero for every fourth subcarrier. If $a^1$ is of length 128 and the FFT length is 512 (numbered 0:511), then cover1 produces non-zero subcarriers 0, 4, 8, . . . . With cover2, only subcarriers 1, 5, 9, . . . are nonzero. Cover3 produces non-zero subcarriers 2, 6, 10 . . . , and cover4 produces subcarriers 3, 7, 1 1, . . . .

During the beacon period, beacons with almost omni-directional antenna patterns (Quasi-omni beacons) are first transmitted. Directional beacons (i.e., beacons transmitted with some antenna gain in some direction(s)) may be transmitted during the beacon period or in the CTAP between two devices.

In one embodiment of the disclosure, a combination of Golay-code length and number of repetitions is adapted to different antenna gains. For example, for an antenna gain of 0-3 dB, the beacons are transmitted using the common mode with a default preamble comprising 32 repetitions of a length-128 Golay code. For antenna gains of 3-6 dB, the beacons employ a shortened preamble of 16 repetitions of the same Golay code. For antenna gains of 6-9 dB, the beacons use a shortened preamble of 8 repetitions of the Golay code. For antenna gains of 9 dB and above, the beacons employ a shortened preamble of 4 repetitions of the Golay code. Furthermore, in some embodiments, header and/or data spreading factors may be scaled relative to the antenna gain.

Figure 9:
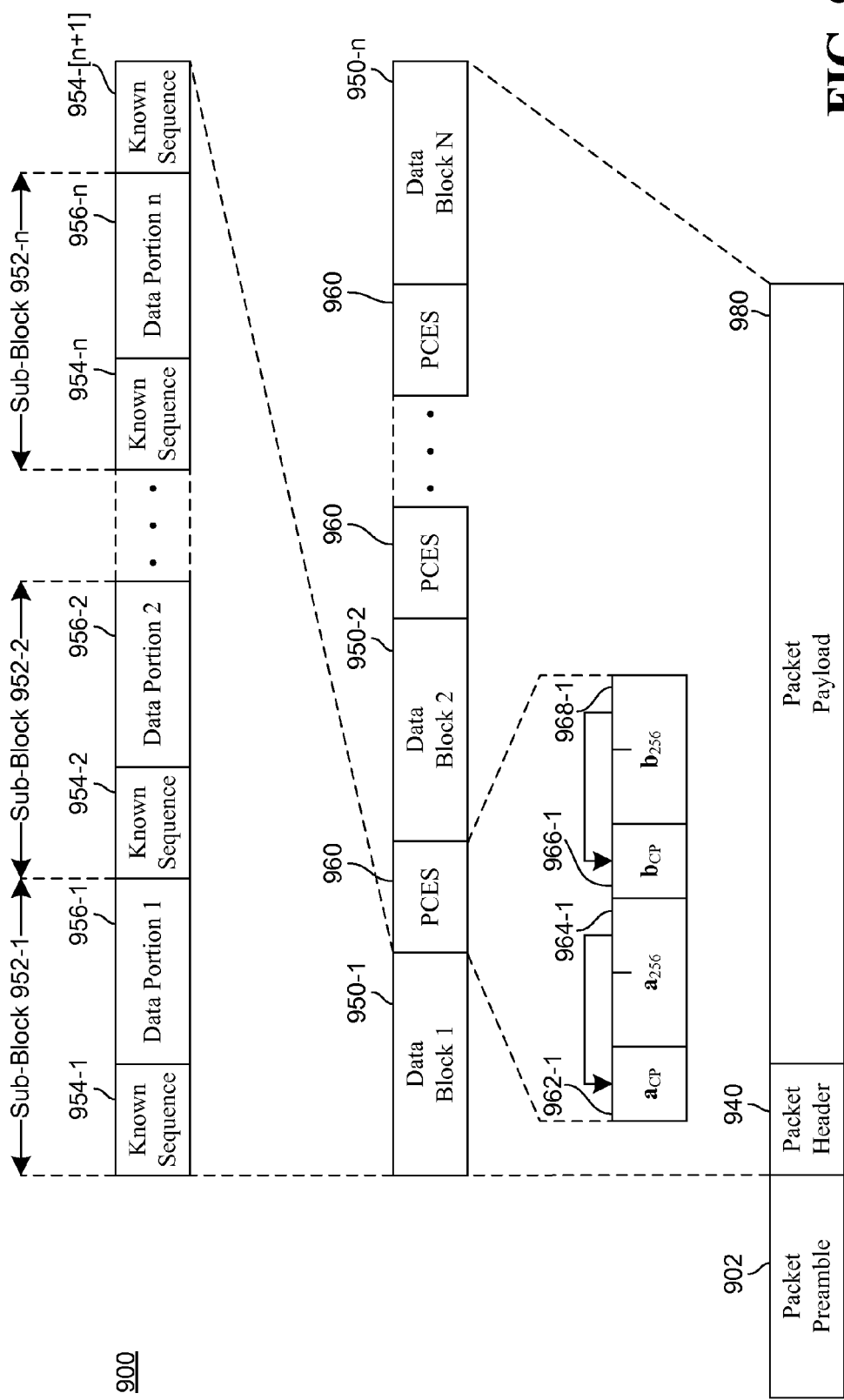
FIG. 9 is a diagram of an improved frame/packet structure that supports improved carrier estimation in accordance with an aspect of the disclosure.

FIG. 9 illustrates a frame structure 900 in accordance with an aspect of the disclosure. In one aspect, the frame structure 900 includes a preamble 902, a header 940, and a packet payload 980. The preamble 902 and packet payload 980 portions are configured in a similar fashion to the preamble 402 and the packet payload 480 of the frame structure 400 of FIG. 4. The data portion of the frame, which may include the header 940 and includes the packet payload 980 is partitioned into a plurality of blocks 950-1 to 950-$n$, and each block 950-1 to 950-$n$ is further partitioned into sub-blocks, such as sub-blocks 952-1 to 952-$n$. Each sub-block 952-1 to 952-$n$ is preceded by a known Golay sequence of length L, such as known Golay sequences 954-1 to 954-$n$, which should be typically longer than the multipath delay spread. Further, the last data portion 956-$n$ is followed by a known Golay sequence 954-[n+1]. In one aspect, all known Golay sequences within a particular data block are identical. The known Golay sequences functions as a cyclic prefix if a frequency domain equalizer is used. Furthermore, it can be used for timing, frequency, and channel tracking Each data block 950-1 to 950-$n$ is followed by a pilot channel estimation sequence (PCES) 960 having a complementary set of Golay codes 964-1 and 968-1 each having a CP 962-1 and 966-2, respectively. The PCES 960 can be used to reacquire the channel if needed, and the repetition period for the PCES 960 can be changed to reduce overhead. The PCES period can, for example, be encoded in the header 940.

Figure 10:
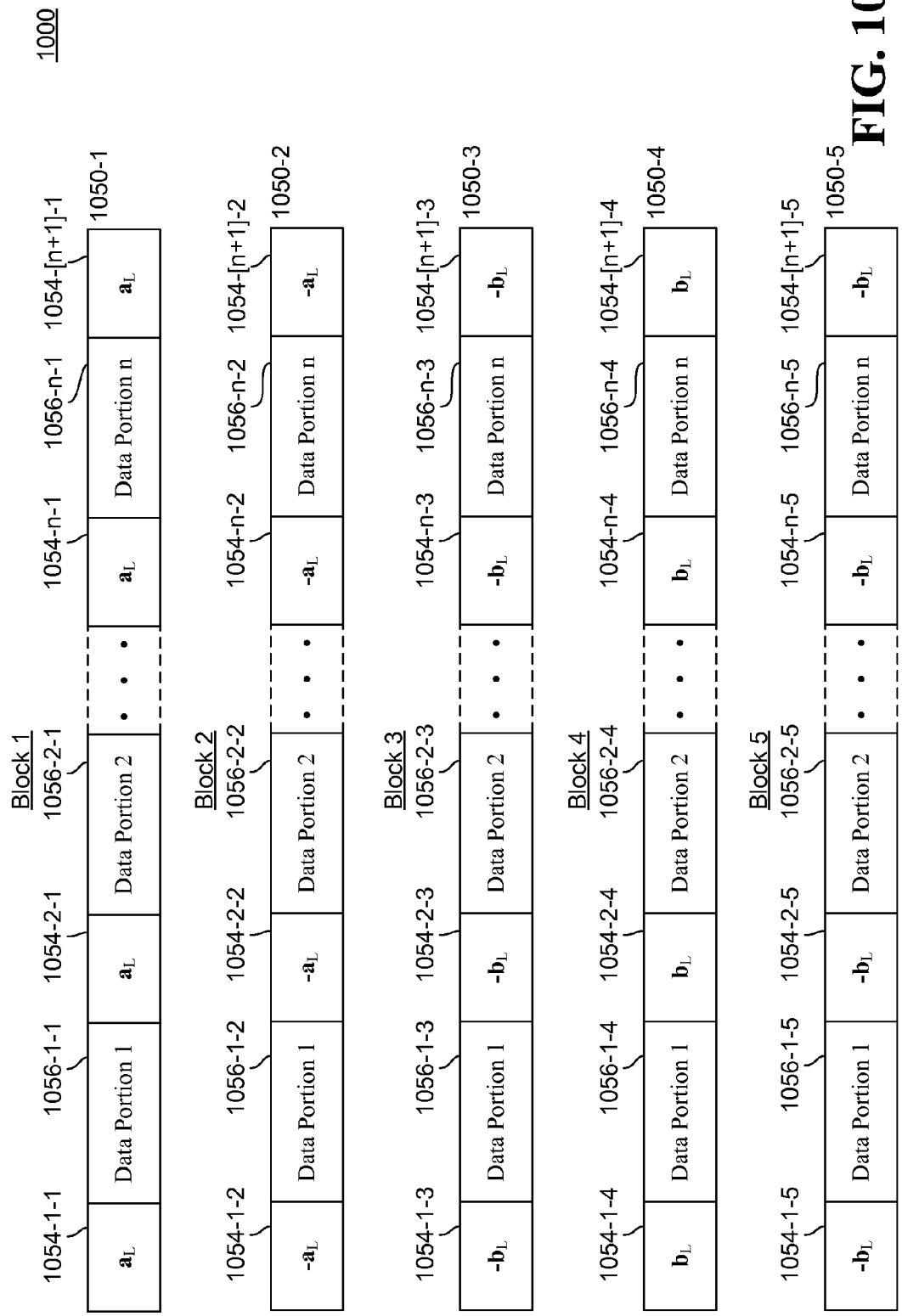
FIG. 10 is a diagram of a plurality of data blocks that may be used with reduced spectral lines in accordance with an aspect of the disclosure.
Figure 11:
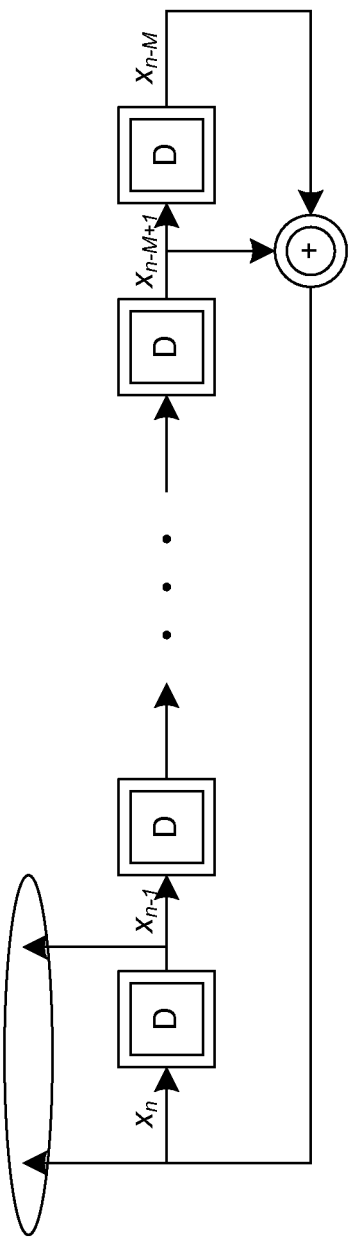
FIG. 11 is a circuit diagram of a scrambler configured in accordance with an aspect of the disclosure.

In order for the known Golay sequences 954-1 to 954-$n$ to be used as a CP in a frequency-domain equalizer (or in other equalizer types), the same L-length Golay sequence (aL) needs to be used. However, a repetition of the known Golay sequence introduces spectral lines. In order to mitigate spectral lines, each data block uses a different known Golay sequence, such as shown in FIG. 10. For example, a pair of Golay codes (aL,bL) may be employed, wherein aL and bL denotes a pair of complementary Golay sequences of length L, or a shorter length K<L protected by its own short cyclic prefix. For example, for L=20, a Golay code-length of 16 may be used with the last 4 samples repeated in the beginning. Each data block may use aL, −aL, bL, or −bL. A scrambler 1100, such as shown in FIG. 11, may be used for selecting Golay codes aL, −aL, bL, and −bL. In one aspect, the scrambler 1100 may be implemented as a feedback-shift register. The scrambler 1100 may be used to choose the Golay codes for each data block.

Figure 12:
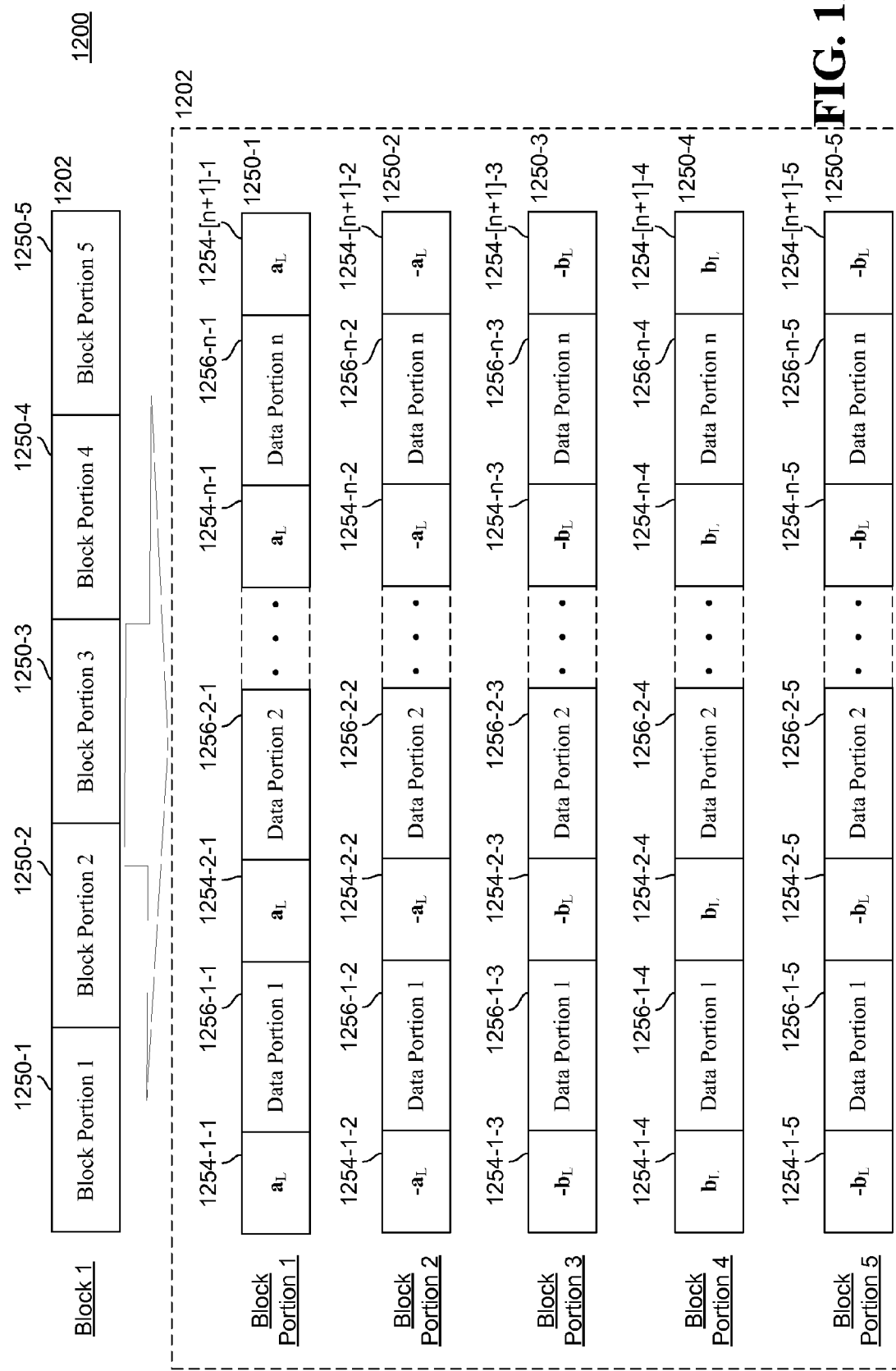
FIG. 12 is a diagram of an improved frame/packet structure configured for longer data blocks in accordance with an aspect of the disclosure.

In another embodiment of the disclosure, longer data blocks may be employed, and a frame structure 1200 shown in FIG. 12 may be employed. In this example, each data block employs one of the four Golay-code options aL, −aL, bL, and −bL., for a portion of the data block, and the codes are changed for each portion. For example, different block portions 1250-1 to 1250-5 of a data block 1202 use different Golay codes (e.g., Golay code 1254-1-1 for block portion 1 1250-1 versus Golay code 1254-1-2 for block portion 2 1250-2).

A known sequence can be used both before and after equalization. For example, techniques for using a known sequence before and after equalization for timing, frequency and channel tracking are well known in the art. However, aspects of the disclosure may provide for further uses of known Golay sequences. After equalization, there is a noisy estimate of the known transmitted Golay sequence. By correlating the estimated noisy version with the original clean version of the Golay sequence, the residual multipath can be estimated and used for time-domain equalization with a very simple short equalizer (e.g., a two-taps equalizer).

Figure 13:
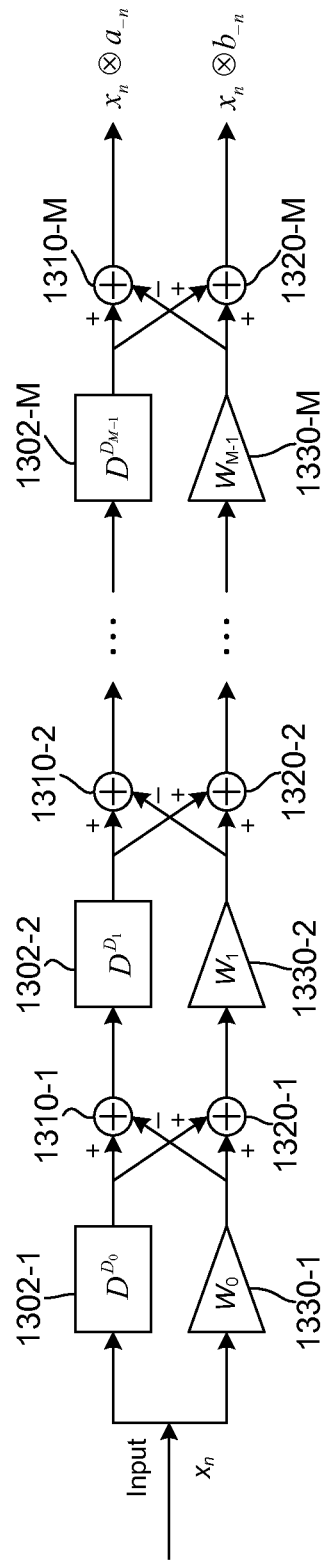
FIG. 13 is a circuit diagram of a Golay circuitry configured in accordance with an aspect of the disclosure.

FIG. 13 is a block diagram of a Golay-code circuitry 1300 that may be employed as a Golay code generator or matched filter in some aspects of the disclosure. The Golay-code circuitry 1300 comprises a sequence of delay elements 1302-1 to 1302-M, a sequence of adaptable seed vector insertion elements 1330-1 to 1330-M, a first set of combiners 1310-1 to 1310-M, and a second set of combiners 1320-1 to 1320-M configured for combining delayed signals with signals multiplied by the seed vector.

In one aspect of the disclosure, the following set of three sequences may be used for the preamble for spatial and frequency reuse to minimize interference between piconets operating in the same frequency band.

| a or b | Delay and Seed Vectors | | | | | | |
|---|---|---|---|---|---|---|---|
| ab | D1 | 64 | 16 | 2 | 32 | 8 | 1 | 4 |
| 0 | D2 | 64 | 16 | 2 | 32 | 8 | 1 | 4 |
| 1 | D3 | 64 | 16 | 2 | 32 | 8 | 1 | 4 |
| 1 | W1 | 1 | 1 | −1 | 1 | −1 | 1 | 1 |
|  | W2 | −1 | 1 | −1 | 1 | −1 | 1 | −1 |
|  | W3 | 1 | 1 | −1 | −1 | −1 | −1 | 1 |

| Sequences in Hexadecimal | |
|---|---|
| s1 | 3663FAAFFA50369CC99CFAAF05AF369C |
| s2 | C99C055005AFC963C99CFAAF05AF369C |
| s3 | 6C39A0F55FF5933993C6A0F5A00A9339 |

The Delay vectors are denoted by D1, D2, and D3, and corresponding seed vectors are denoted by W1, W2, and W3. The first sequence employs Golay code a, and the second and third sequences are type-b sequences. The binary sequences (s1, s2, and s3) are provided in hexadecimal format. These sequences are optimized to have minimum sidelobe levels and minimum cross-correlation.

Common mode data sequences may employ the following set of Golay complementary codes.

| Delay and Seed Vectors | | | | | | |
|---|---|---|---|---|---|---|
| D1 | 16 | 32 | 4 | 8 | 2 | 1 |
| D2 | 16 | 32 | 4 | 8 | 2 | 1 |
| D3 | 16 | 32 | 4 | 8 | 2 | 1 |
| W1 | −1 | 1 | −1 | 1 | 1 | 1 |
| W2 | −1 | −1 | −1 | 1 | −1 | 1 |
| W3 | 1 | 1 | −1 | 1 | −1 | 1 |

| Sequences in Hexadecimal | |
|---|---|
| a1 | 2DEE2DEE22E1DD1E |
| b1 | 78BB78BB77B4884B |
| a2 | E122E12211D2EE2D |
| b2 | B477B4774487BB78 |
| a3 | E1221EDDEE2DEE2D |
| b3 | B4774B88BB78BB78 |

The Golay sequences a and b are of length 64. Each symbol carries 2 bits per symbol. For example, when the 2 bits are "00," a is transmitted. When the bits are "01," -a is transmitted. When the bits correspond to "10," b is transmitted; and for the bit combination "11", -b is transmitted.

Three pairs of complementary Golay codes are employed for frequency reuse, wherein one pair is used per piconet. These pairs are provided selected to have low cross-correlation between each other and with the preamble. These codes can be used as well as the known sequences before each sub-burst In one aspect of the disclosure, the following length-16 and length-8 codes may be used as spreading codes and/or as the known cyclic prefix before each sub-burst.

| Delay and Seed Vectors For length 16 sequences | | | |
|---|---|---|---|
| D1 | 4 | 2 | 8 | 1 |
| D2 | 4 | 8 | 2 | 1 |
| D3 | 4 | 2 | 8 | 1 |
| W1 | 1 | 1 | −1 | 1 |
| W2 | 1 | 1 | −1 | 1 |
| W3 | −1 | 1 | −1 | 1 |

| Delay and Seed Vectors For length 8 sequences | | | |
|---|---|---|---|
| D1 | 4 | 2 | 1 |
| D2 | 2 | 1 | 4 |
| D3 | 2 | 4 | 1 |
| W1 | 1 | 1 | 1 |
| W2 | 1 | 1 | 1 |
| W3 | −1 | 1 | 1 |

| Length 16 Sequences in Hexadecimal | |
|---|---|
| a1 | 56CF |
| b1 | 039A |
| a2 | 1EDD |
| b2 | 4B88 |
| a3 | A63F |
| b3 | F36A |

| Length 8 Sequences in Hexadecimal | |
|---|---|
| a1 | DE |
| b1 | 8B |
| a2 | BE |
| b2 | 4E |
| a3 | AC |
| b3 | F9 |

In various aspects of the disclosure, the following sequences of length 128 shown in hexadecimal and generated from the following delay and seed vectors may be provided as the cyclic prefix or for the PCES field.

| Delay and Seed Vectors | | | | | | |
|---|---|---|---|---|---|---|
| D1 | 64 | 32 | 16 | 4 | 2 | 8 | 1 |
| D2 | 64 | 32 | 16 | 4 | 2 | 8 | 1 |
| D3 | 64 | 32 | 16 | 4 | 2 | 8 | 1 |
| W1 | 1 | 1 | 1 | 1 | 1 | 1 | 1 |
| W2 | 1 | −1 | −1 | −1 | 1 | −1 | 1 |
| W3 | −1 | −1 | 1 | 1 | −1 | −1 | 1 |

| Sequences in Hexadecimal | |
|---|---|
| a1 | 593F5630593FA9CFA6C0A9CF593FA9CF |
| b1 | 0C6A03650C6AFC9AF395FC9A0C6AFC9A |
| a2 | 56CFA63FA930A63FA93059C0A930A63F |
| b2 | 039AF36AFC65F36AFC650C95FC65F36A |
| a3 | 950C9A036AF39A03950C9A03950C65FC |
| b3 | C059CF563FA6CF56C059CF56C05930A9 |

In one aspect of the disclosure, the following sequences of length-256 and 512 may be used in the Pilot Channel Estimation Sequences (PCES). These sequences have low cross-correlation with each other and with the preamble.

| Delay and Seed Vectors for length-256 sequences | | | | | | | |
|---|---|---|---|---|---|---|---|
| D1 | 128 | 64 | 32 | 16 | 4 | 2 | 8 | 1 |
| D2 | 128 | 64 | 32 | 16 | 4 | 2 | 8 | 1 |
| D3 | 128 | 64 | 32 | 16 | 4 | 2 | 8 | 1 |
| W1 | −1 | 1 | 1 | 1 | 1 | 1 | 1 | 1 |
| W2 | −1 | −1 | −1 | 1 | 1 | 1 | 1 | 1 |
| W3 | 1 | 1 | −1 | 1 | −1 | −1 | 1 | 1 |

| Length-256 Sequences in Hexadecimal |
| --- |
| a1 593F5630593FA9CF593F5630A6C05630593F5630593FA9CFA6C0A9CF593FA9CF |
| b1 0C6A03650C6AFC9A0C6A0365F39503650C6A03650C6AFC9AF395FC9A0C6AFC9A |
| a2 593F5630A6C05630A6C0A9CFA6C05630593F5630A6C05630593F5630593FA9CF |
| b2 0C6A0365F3950365F395FC9AF39503650C6A0365F39503650C6A03650C6AFC9A |
| a3 9AFC95F3650395F39AFC95F39AFC6A0C65036A0C9AFC6A0C9AFC95F39AFC6A0C |
| b3 CFA9C0A63056C0A6CFA9C0A6CFA93F5930563F59CFA93F59CFA9C0A6CFA93F59 |

| Delay and Seed Vectors for length-512 sequences | | | | | | | | |
| --- | --- | --- | --- | --- | --- | --- | --- | --- |
| D1 256 | 128 | 64 | 32 | 16 | 4 | 2 | 8 | 1 |
| D2 256 | 128 | 64 | 32 | 16 | 4 | 2 | 8 | 1 |
| D3 256 | 128 | 64 | 32 | 16 | 4 | 2 | 8 | 1 |
| W1 1 | 1 | 1 | 1 | 1 | 1 | 1 | 1 | 1 |
| W2 −1 | 1 | 1 | 1 | −1 | −1 | −1 | 1 | 1 |
| W3 −1 | −1 | −1 | 1 | −1 | 1 | 1 | −1 | 1 |

| Length-512 Sequences in Hexadecimal |
| --- |
| a1 593F5630593FA9CF593F5630A6C05630593F5630593FA9CFA6C0A9CF593FA 9CFA6C0A9CFA6C05630A6C0A9CF593FA9CF593F5630593FA9CFA6C0A9CF59 3FA9CF |
| b1 0C6A03650C6AFC9A0C6A0365F39503650C6A03650C6AFC9AF395FC9A0C6AF C9AF395FC9AF3950365F395FC9A0C6AFC9A0C6A03650C6AFC9AF395FC9A0C 6AFC9A |
| a2 9AFC6A0C9AFC95F39AFC6A0C65036A0C9AFC6A0C9AFC95F3650395F39AFC9 5F39AFC6A0C9AFC95F39AFC6A0C65036A0C650395F365036A0C9AFC6A0C65 036A0C |
| b2 CFA93F59CFA9C0A6CFA93F5930563F59CFA93F59CFA9COA63056C0A6CFA9C 0A6CFA93F59CFA9C0A6CFA93F5930563F593056C0A630563F59CFA93F5930 563F59 |
| a3 A63F56CFA63FA93059C0A930A63FA93059C0A93059C056CF59C0A930A63FA 930A63F56CFA63FA93059C0A930A63FA930A63F56CFA63FA930A63F56CF59 C056CF |
| b3 F36A039AF36AFC650C95FC65F36AFC650C95FC650C95039A0C95FC65F36AF C65F36A039AF36AFC650C95FC65F36AFC65F36A039AF36AFC65F36A039A0C 95039A |

Figure 14:
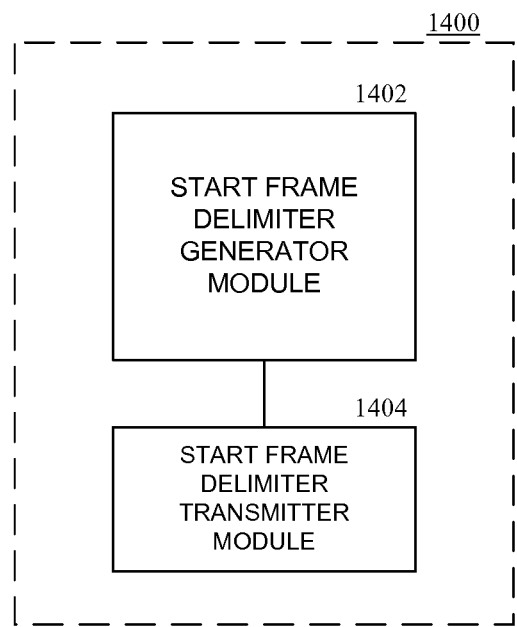
FIG. 14 is a block diagram of a start frame delimiter generator apparatus configured in accordance with an aspect of the disclosure.

FIG. 14 illustrates a start frame delimiter generation apparatus 1400 that may be used in various aspects of the disclosure, with a timestamp generation module 1402 for generating a packet that includes a first portion and a second portion separated by a delimiter, wherein the delimiter is further used to signal a characteristic of the second portion; and a packet transmission module 1404 for transmitting the packet.

Figure 15:
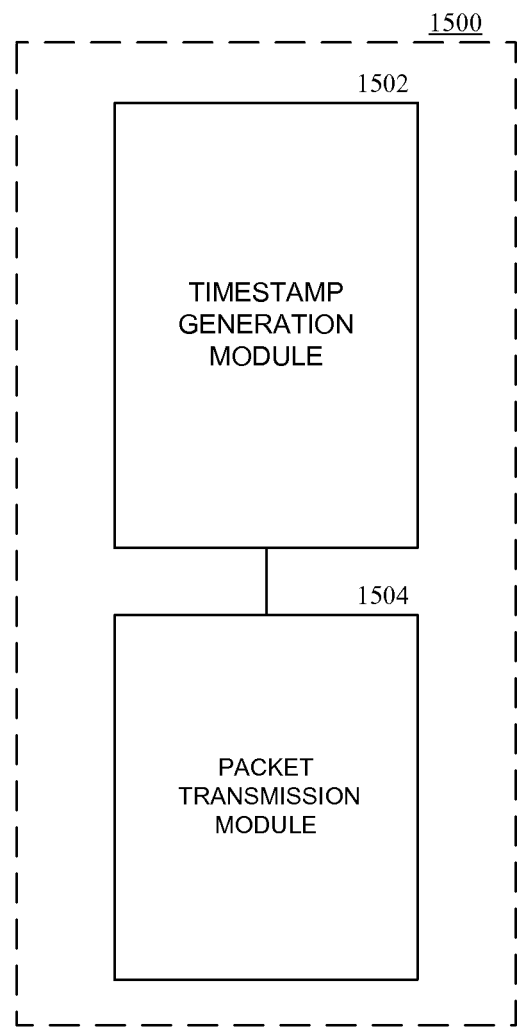
FIG. 15 is a block diagram of a timestamp generator apparatus configured in accordance with an aspect of the disclosure; and, FIG. 16 is a block diagram of a channel estimation sequence generator apparatus configured in accordance with an aspect of the disclosure.

FIG. 15 illustrates a timestamp generation apparatus 1500 that may be used in various aspects of the disclosure, with a timestamp generation module 1502 for generating a packet having a header that includes location information of the packet with respect to a beacon; and a timestamp transmission module 1504 for transmitting the packet, wherein the packet and the beacon are transmitted within a superframe.

Figure 16:
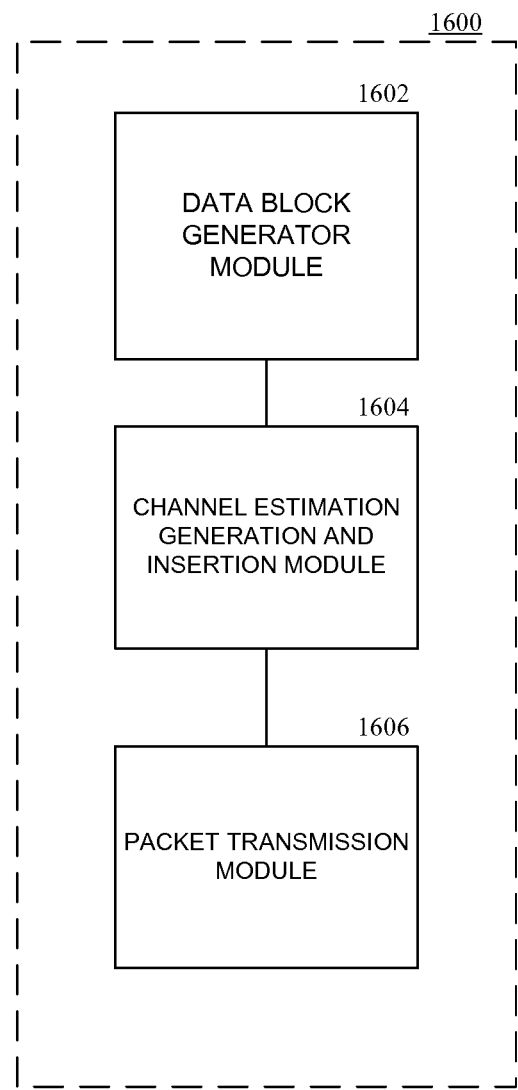

FIG. 16 illustrates a channel estimation sequence generation apparatus 1600 that may be used in various aspects of the disclosure, with a data block generator module 1602 for dividing a payload of a packet into a plurality of data blocks, wherein each data block includes Golay codes and data portions, and every data portion is between two Golay codes; a channel estimation sequence generation and insertion module 1604 for inserting information between data blocks of the plurality of data blocks, said information enabling at least one of time, channel and frequency estimation; and a packet transmission module 1606 for transmitting the packet.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

The disclosure is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the disclosure may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the disclosure. It should be appreciated that those skilled in the art will be able to devise various arrangements, which, although not explicitly described or shown herein, embody the principles of the disclosure and are included within its scope. Furthermore, all examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the disclosure. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

The invention claimed is:

1. A method of communication, comprising:
   selecting different Golay codes to include for each of a plurality of data blocks;
   dividing a payload of a packet into the plurality of data blocks, wherein each data block comprises Golay codes and data portions, and every data portion of a data block is between two of the Golay codes selected for that data block;
   inserting information between two successive data blocks of the plurality of data blocks, said information comprising at least two different Golay codes and enabling at least one of time, channel and frequency estimation; and
   transmitting the packet.

2. The method of claim 1, wherein the transmission comprises transmitting the packet to another apparatus, wherein both of the apparatuses have the information a priori.

3. The method of claim 1, wherein at least one Golay code contained in one data block is different from at least one Golay code contained in another data block.

4. The method of claim 1, wherein Golay codes contained in one of the data blocks are identical.

5. The method of claim 1, wherein the information comprises a pilot channel estimation sequence.

6. The method of claim 5, wherein the pilot channel estimation sequence is based on a pair of complementary Golay codes.

7. The method of claim 1, wherein the Golay code selected for each data block comprises a Golay code and a portion of the Golay code as a cyclic prefix.

8. The method of claim 1, wherein the selecting comprises utilizing a feedback shift register.

9. An apparatus for communication, comprising:
   means for selecting different Golay codes to include for each of a plurality of data blocks;
   means for dividing a payload of a packet into the plurality of data blocks, wherein each data block comprises Golay codes and data portions, and every data portion of a data block is between two of the Golay codes selected for that data block;
   means for inserting information between two successive data blocks of the plurality of data blocks, said information comprising at least two different Golay codes and enabling at least one of time, channel and frequency estimation; and
   means for transmitting the packet.

10. The apparatus of claim 9, wherein the transmitting means transmits the packet to another apparatus and both of the apparatuses have the information a priori.

11. The apparatus of claim 9, wherein at least one Golay code contained in one data block is different from at least one Golay code contained in another data block.

12. The apparatus of claim 9, wherein Golay codes contained in one of the data blocks are identical.

13. The apparatus of claim 9, wherein the information comprises a pilot channel estimation sequence.

14. The apparatus of claim 13, wherein the pilot channel estimation sequence is based on a pair of complementary Golay codes.

15. The apparatus of claim 9, wherein the Golay code for each data block comprises a Golay code and a portion of the Golay code as a cyclic prefix.

16. The apparatus of claim 9, wherein the selecting means comprises a feedback shift register.

17. An apparatus for wireless communications comprising:
   a processing system configured to:
   select different Golay codes to include for each of a plurality of data blocks;
   divide a payload of a packet into the plurality of data blocks, wherein each data block comprises Golay codes and data portions, and every data portion of a data block is between two of the Golay codes selected for that data block;
   insert information between two successive data blocks of the plurality of data blocks, said information comprising at least two different Golay codes and enabling at least one of time, channel and frequency estimation; and
transmit the packet.

18. The apparatus of claim 17, wherein the processing system being further configured to transmit the information to another apparatus, wherein both of the apparatuses have the information a priori.

19. The apparatus of claim 17, wherein at least one Golay code contained in one data block is different from at least one Golay code contained in another data block.

20. The apparatus of claim 17, wherein Golay codes contained in one of the data blocks are identical.

21. The apparatus of claim 17, wherein the information comprises a pilot channel estimation sequence.

22. The apparatus of claim 21, wherein the pilot channel estimation sequence is based on a pair of complementary Golay codes.

23. The apparatus of claim 17, wherein the Golay code for each data block comprises a Golay code and a portion of the Golay code as a cyclic prefix.

24. The apparatus of claim 17, wherein the selection is performed by a feedback shift register of the processing system.

25. A computer-program product for communication, comprising:
a non-transitory computer-readable medium encoded with instructions executable to:
select different Golay codes to include for each of a plurality of data blocks;
divide a payload of a packet into the plurality of data blocks, wherein each data block comprises Golay codes and data portions, and every data portion of a data block is between two of the Golay codes selected for that data block;
insert information between two successive data blocks of the plurality of data blocks, said information comprising at least two different Golay codes and enabling at least one of time, channel and frequency estimation; and
transmit the packet.

26. A piconet coordinator comprising:
an antenna; and
a processing system configured to:
select different Golay codes to include for each of a plurality of data blocks;
divide a payload of a packet into the plurality of data blocks, wherein each data block comprises Golay codes and data portions, and every data portion of a data block is between two of the Golay codes selected for that data block;
insert information between two successive data blocks of the plurality of data blocks, said information comprising at least two different Golay codes and enabling at least one of time, channel and frequency estimation; and
transmit the packet via the antenna.

* * * * *